Jan. 3, 1967     C. W. ALLEN     3,295,874

BOLT JOINT WITH SCREW TETHERING MEANS

Filed May 24, 1963

INVENTOR.
Clifford W. Allen
BY Ralph W. McIntire, Jr.
Attorney 3,295,874
BOLT JOINT WITH SCREW TETHERING MEANS
Clifford W. Allen, Monroeville, Pa., assignor to Westinghouse Air Brake Company, Wilmerding, Pa., a corporation of Pennsylvania
Filed May 24, 1963, Ser. No. 282,933
5 Claims. (Cl. 287—189.36)

This invention relates generally to a screw tethering device, and relates particularly to such a device for providing freedom of axial movement of a screw within a bore while preventing the screw from being withdrawn from said bore after insertion therein.

In many mechanical devices where it is desired to normally attach one element to another by means of a screw or screws extending through a bore in one of the elements into a corresponding threaded bore in the other element, it is expedient to tether the screw to the one element to allow freedom of axial movement of the screw to allow entry and withdrawal of the screw from the bore in the other element, while at the same time tethering the screw to the one element to prevent loss of the screw when the two elements are separated.

Heretofore, tethering was achieved by providing means such as a nut on the shank of the screw after insertion of the screw through the bore element in the one element, which means by their nature substantially exceeded the diameter of the screw when installed and thus required a relatively large space laterally of the screw shank to accommodate the nut or similar element.

It is the object of the present invention to provide on a standard screw shank, after insertion of the screw through a bore in an element, a screw tethering means, which means is relatively inexpensive, easy to install, and has a maximum diameter only slightly larger than that of the screw shank when installed, thus permitting utilization of the screw tethering means in relatively confined spaces. This object is achieved in the present invention by threading onto the screw shank, after insertion of the screw through the bore in an element intended to be attached to another element, a closely wound helical coil spring in which the diameter of the wire comprising the coil corresponds to the V-notch in the screw thread so that the wire element lies and fits within the V-notch between adjacent threads near the crests of the threads providing an outside diameter slightly larger than the bore through which the screw is inserted in the one element, thus preventing removal of the screw from the bore in the one element after withdrawal of the screw from the threaded bore in the other element. The diameter of the coil in its normal condition before installation on the screw is preferably slightly smaller than the screw shank diameter so that windings of the spring must be slightly expanded for installation on the shank, thus providing a tight fit between the coil and the shank to render the coil spring impervious to loosening due to vibration. If desired, the windings of the coil before installation may be tighter wound, that is, at a lesser pitch than the threads on the screw so that slight elongation of the coil is effected at installation to further tighten the coil upon the screw.

These and other objects of the invention will be apparent by referring to the following description, taken in conjunction with the accompanying drawing, in which.

Figure 2:
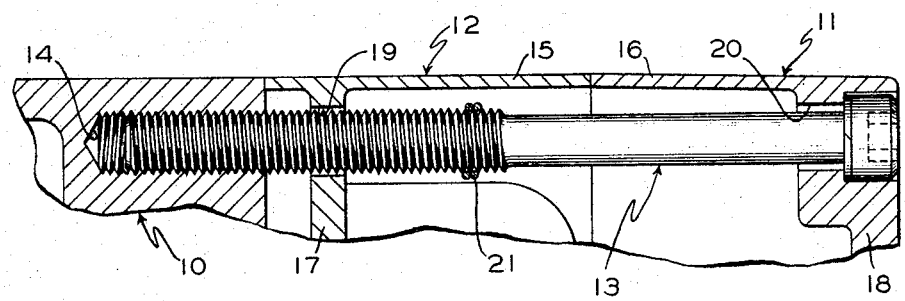
FIG. 2 is a cross-sectional view of two elements attached by means of the screw and tethering means of FIG. 1 with the screw shown in the fully inserted position.
Figure 3:
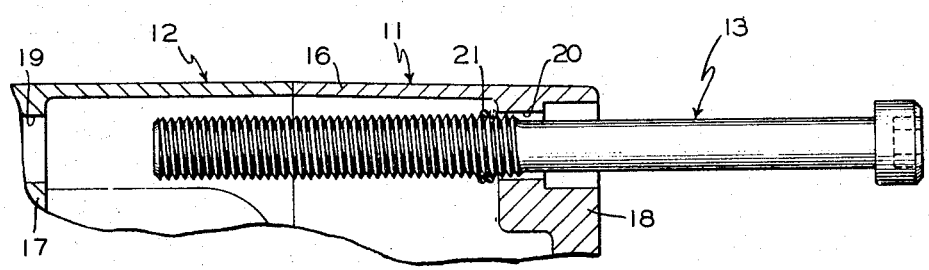
FIG. 3 is a view similar to that of FIG. 2 showing the screw in its fully withdrawn position.

Referring now to FIGS. 2 and 3 of the drawing, there are shown three elements 10, 11 and 12 intended to be releasably attached together by means of one or more conventional screws 13, the element 10 representing a portion of a conventional cylindrical or rectangular main valve body of a spool valve device, having a movable spool valve member (not shown), the element 12 representing a housing for a solenoid-responsive valve for operating the main valve, and element 11 representing a cover for carrying therein a solenoid (not shown) for operating the solenoid-responsive valve. The details of the spool valve device, the solenoid valve and the solenoid are not pertinent to the description of the present invention, and accordingly the description thereof is omitted. It will be understood that the nature of elements 10, 11 and 12 as portions of a spool valve device is merely exemplary of a wide variety of elements which may be attached together utilizing the present invention as hereinafter described.

The element 10 may be cylindrical or rectangular or other form containing therein one or more threaded bores 14 disposed coaxially with the element 10 and adapted to receive the threaded end of screws 13, only one bore and one screw being shown.

The element or cover member 11 and the valve body 12 are hollow and each comprises a cylindrical or rectangular portion 15 and 16, respectively, and each having therein at least one wall portion 17 and 18, respectively. A bore 19 in wall 17 is coaxially disposed with a bore 20 in wall 18 for each of the screws 13, with each pair of bores 19, 20 coaxially disposed to align with each of the bores 14 in the element 10 when the cover 11 and housing 12 are abutted thereto in the position as shown in FIG. 2. The cover 11 and housing 12 are securely attached to the body 10 when the screws 13 are inserted through bores 19 and 20 and threaded tightly into threaded bores 14 in the body 10. The bores 19, 20 are preferably only slightly large enough to accommodate the threads on screw 13 during insertion of the screw through the cap 11 into the body 10 so as to minimize the size of the screw tethering means as hereinafter described in detail.

Figure 1:
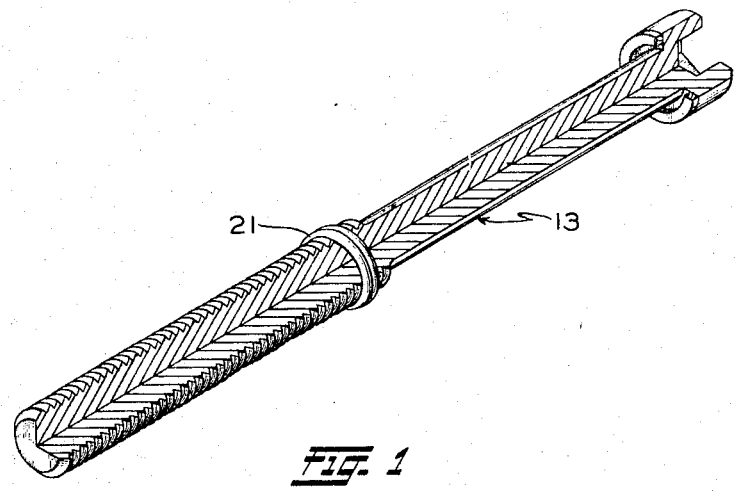
FIG. 1 is a perspective view of a standard screw, partially in cross section, showing the novel screw tethering means installed thereon.

The screw tethering means 21 comprises one or more turns of a conventional closely wound resilient member preferably comprising a helical spring and is threaded onto the screw and disposed away from the threaded end as shown in FIGS. 1, 2 and 3. The wire diameter of the coil windings is selected in accordance with the size of the screw threads so that when the spring is installed on the screw 13, as shown, each turn rests securely between the crests of two adjacent threads with the outside diameter of the coil windings extending beyond the outside diameters of the individual threads thereby effectively increasing the outside diameter of the screw so as to be greater than the diameter of the bore 20 to prevent complete withdrawal of the screw from the bore 20 in the manner shown in FIG. 3. The pre-installation inside diameter of the coil 21 is selected to be slightly less than the diameter of the screw threads so that slight expansion of the coil diameter is required to effect installation thereof on the screw shank, thereby effecting a firm fit of the turns of the coil spring 21 upon the screw 13 to prevent loosening of the spring under the influence of vibration. Preferably, the pitch of the turns of the spring before installation is slightly less than the screw threads so that upon installation, a slight lengthening of the coil is effected, which lengthening tends to decrease the diameter of the spring to thus provide an additional spring tightening force with respect to the screw.

It is apparent from the drawing that the tethering means is installed upon the screw after insertion of the screw through the bore 20 in end face 18 of cover 11 and before entry of the screw into bore 19 in wall 17 of housing 12.

From the foregoing, it is apparent that the utilization of a coil spring as a tethering means effects only a slight increase in the diameter of the screw shank, as compared with other tethering devices such as a nut which is more expensive, and which necessarily provides a relatively larger diameter than the screw when installed. Thus, the present invention, requiring a relatively smaller space laterally of the screw shank for installation, may be utilized in a more confined space. Moreover, it is apparent that if bore 20 were also threaded, which structure is not shown, the diameter of the wire comprising coil 21 could be smaller so that upon installation the outside diameter of the coil could be less than the outside diameter of the screw threads and yet be operative and effective to prevent withdrawal of the screw from bore 20, it being only necessary that the coil windings over fill the space between the threads on the screw and the threads in bore 20.

It is also apparent from the foregoing that the operation of the tethering means 21, after installation, requires that the two bores 14 and 20 be axially spaced from one another to allow movement of the screw 13 to permit insertion and withdrawal of the screw 13 from bore 14. This spacing in the present invention is provided by the intervening hollow element 12 and the hollow element 11 which cooperate to provide a travel space for the tethering means, which travel space is greater in length than the depth said screw is inserted in the threaded bore when the screw is in the tightened condition, as illustrated in FIGS. 2 and 3 of the drawing. However, it is apparent that where only two elements are intended to be attached to each other, the axial spacing of the bores in the respective elements may be provided in a variety of ways such as by the provision of a counterbore in either element, the counterbore having a larger diameter than the tethering means, or by the provision of an axially extending flange on either element 11 or 10.

Having now described the invention, what I claim is new and desire to secure by Letters Patent is:

1. In combination:
   (a) a first member having a smooth bore therein,
   (b) a second member having a threaded bore therein aligned with said smooth bore,
   (c) a third member disposed between and in alignment with said first and said second members and providing an axial space between said smooth bore and said threaded bore,
   (d) a screw having a head at one end thereof larger than said smooth bore and having threads thereon having an outside diameter smaller than that of said smooth bore, which threads are axially passed through said smooth bore and received into said threaded bore up to a predetermined maximum length when said screw is tightened for holding said first, second and third members in assembled abutting and aligned relationship,
   (e) tethering means fixedly installed on said screw and preventing complete withdrawal of said screw through said smooth bore, and
   (f) said first member and said third member cooperating to define traveling space accommodating said tethering means for travel thereof between and including a first position in which said screw threads are received in said threaded bore when said screw is tightened and including a second position in which said screw threads are fully withdrawn from said threaded bore, the length of said traveling space axially of said bore and said threaded bore being greater than the said predetermined maximum length said screw threads are received in said threaded bore while in said first position.

2. The combination as recited in claim 1, but further characterized in that said tethering means comprises an annular resilient means surrounding the threaded portion in gripping relationship.

3. The combination as recited in claim 2, but further characterized in that said resilient means comprises at least more than one-half of one turn of a coil spring.

4. The combination as recited in claim 3, but further characterized in that said coil spring when in the unstressed condition before installation has an inside diameter slightly less than the diameter thereof when installed upon said portion of said threaded portion.

5. The combination as recited in claim 4, but further characterized in that the pitch of said coil spring is slightly less than the pitch of the threads of said portion.

References Cited by the Examiner

UNITED STATES PATENTS

| 1,172,722 | 2/1916 | Millard | 151—30 |
| 1,429,117 | 9/1922 | Thomas | 151—69 |
| 1,887,568 | 11/1932 | Stanford | 151—30 |
| 2,929,474 | 3/1960 | Boardman | 151—69 |
| 3,193,064 | 7/1965 | Matheson et al. | 85—32 X |

FOREIGN PATENTS 1,104,476  12/1955  France.

FRANK L. ABBOTT, *Primary Examiner.*

RICHARD W. COOKE, Jr., *Examiner.*

J. D. LISTER, R. S. VERMUT, *Assistant Examiners.*